US011611508B2

(12) United States Patent
Yang

(10) Patent No.: US 11,611,508 B2
(45) Date of Patent: Mar. 21, 2023

(54) PACKET FORWARDING METHOD AND NETWORK DEVICE

(71) Applicant: Huawei Technologies Co., Ltd., Shenzhen (CN)

(72) Inventor: Jie Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 17/234,192

(22) Filed: Apr. 19, 2021

(65) Prior Publication Data

US 2021/0328918 A1 Oct. 21, 2021

(30) Foreign Application Priority Data

Apr. 20, 2020 (CN) ........................ 202010314701.8

(51) Int. Cl.

| | |
|---|---|
| ***H04L 12/46*** | (2006.01) |
| ***H04L 12/713*** | (2013.01) |
| ***H04L 12/723*** | (2013.01) |
| ***H04L 12/751*** | (2013.01) |
| ***H04L 45/586*** | (2022.01) |
| ***H04L 45/02*** | (2022.01) |
| ***H04L 45/50*** | (2022.01) |

(52) U.S. Cl.

CPC ........ *H04L 45/586* (2013.01); *H04L 12/4633* (2013.01); *H04L 12/4641* (2013.01); *H04L 45/02* (2013.01); *H04L 45/50* (2013.01)

(58) Field of Classification Search

CPC ... H04L 12/46; H04L 12/462; H04L 12/4629; H04L 12/4633; H04L 12/4641; H04L 12/4679; H04L 12/66; H04L 45/02; H04L 45/50; H04L 45/54; H04L 45/586; H04L 45/76; H04L 47/17; H04L 47/24; H04L 63/0272; H04L 63/029

See application file for complete search history.

(56) References Cited

U.S. PATENT DOCUMENTS 7,486,659 B1 * 2/2009 Unbehagen ......... H04L 12/4633 370/395.31

7,593,352 B2 * 9/2009 Verma ..................... H04L 45/04 370/255

(Continued)

OTHER PUBLICATIONS

M. Mahalingam et al, "Virtual extensible Local Area Network (VXLAN): A Framework for Overlaying Virtualized Layer 2 Networks over Layer 3 Networks," RFC 7348, Aug. 2014, 22 pages.

*Primary Examiner* — Alpus Hsu

(74) *Attorney, Agent, or Firm* — Conley Rose, P.C.

(57) ABSTRACT

A packet forwarding method includes obtaining, by a network device, a first tunnel identifier of a first packet. When the first tunnel identifier is a first value, and forwarding, by the network device, the first packet based on a first routing group in a virtual routing and forwarding (VRF) table. The first routing group consists of one or more local routes, and each next-hop outbound interface of the one or more local routes is a local outbound interface. The network device forwards the packet based on a local routing group including only a local route in the VRF table such that the packet is forwarded to a local virtual machine for processing, and is not forwarded to another tunnel endpoint device during packet forwarding.

20 Claims, 9 Drawing Sheets

500

A network device obtains a first tunnel identifier of a first packet — 501

When the first tunnel identifier is a first value, the network device forwards the first packet based on a first routing group in a VRF table — 502

(56) References Cited

U.S. PATENT DOCUMENTS 8,320,388 B2 * 11/2012 Louati .................... H04L 45/00 370/254
8,761,043 B2 * 6/2014 Papp .................. H04L 12/4641 370/254
8,953,590 B1 * 2/2015 Aggarwal ........... H04L 12/4675 370/409
9,331,938 B2 * 5/2016 Davie ................ H04L 41/0803
9,634,936 B2 * 4/2017 Bansal ................... H04L 45/38
10,091,102 B2 * 10/2018 Thubert ................ H04L 63/164
10,097,467 B1 * 10/2018 Singh ..................... H04L 12/18
10,116,567 B1 * 10/2018 Singh .................... H04L 47/122
10,237,176 B2 * 3/2019 Mutnuru ............... H04L 47/125
10,320,671 B2 * 6/2019 Davie ................ H04L 41/0803
10,673,737 B2 * 6/2020 Indiresan ................ H04L 45/04
10,848,421 B2 * 11/2020 Osborne ............ H04L 12/4641
10,992,577 B2 * 4/2021 Mutnuru ................. H04L 45/42
2010/0027549 A1 2/2010 Satterlee et al.
2010/0158010 A1 * 6/2010 Kang ...................... H04L 45/50 370/392
2017/0339054 A1 11/2017 Yadav et al.
2019/0141010 A1 5/2019 Chander et al.
2020/0412562 A1 * 12/2020 Peng .................. H04L 12/4675

* cited by examiner

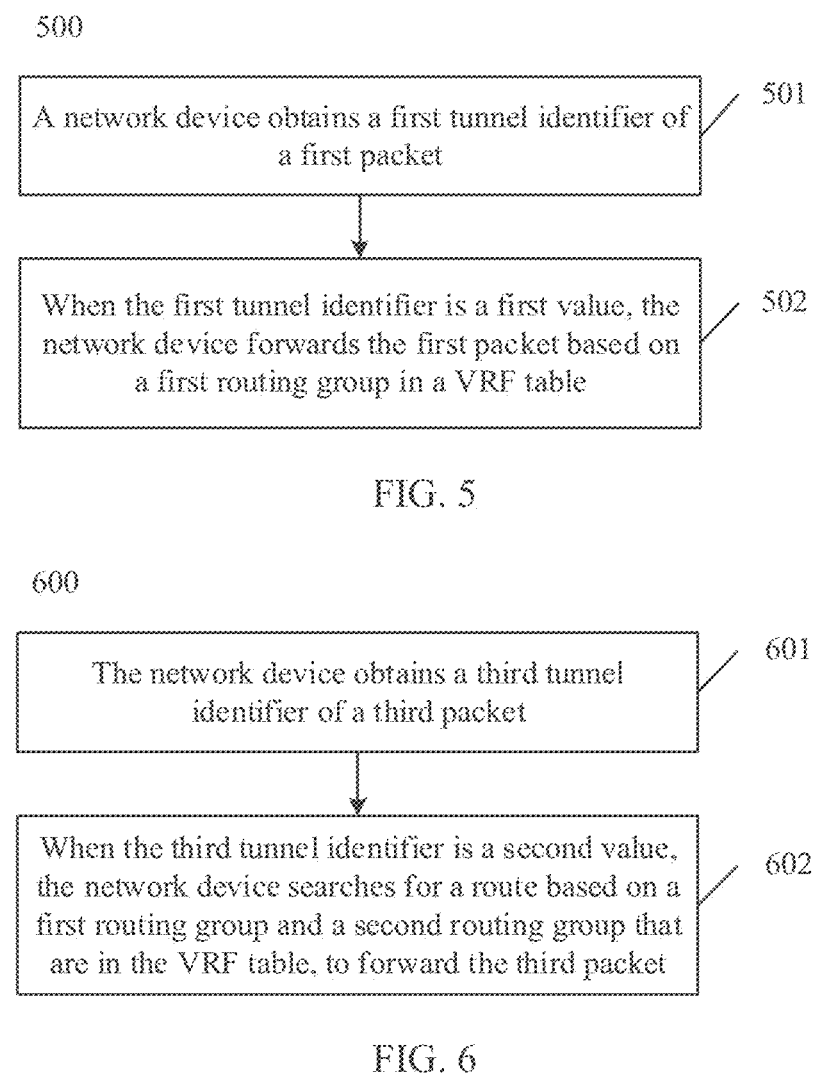

500

A network device obtains a first tunnel identifier of a first packet — 501

When the first tunnel identifier is a first value, the network device forwards the first packet based on a first routing group in a VRF table — 502

The network device obtains a third tunnel identifier of a third packet — 601

When the third tunnel identifier is a second value, the network device searches for a route based on a first routing group and a second routing group that are in the VRF table, to forward the third packet — 602

FIG. 6

PACKET FORWARDING METHOD AND NETWORK DEVICE

CROSS-REFERENCE TO RELATED APPLICATION

This application claims priority to Chinese Patent Application No. 202010314701.8 filed on Apr. 20, 2020, which is hereby incorporated by reference in its entirety.

TECHNICAL FIELD

This application relates to the field of communications technologies, and in particular, to a packet forwarding method and a network device.

BACKGROUND

With rapid development of cloud computing, a data center is becoming increasingly virtualized. To meet an increasing user requirement, the data center usually uses a Virtual Extensible Local Area Network (VXLAN) technology to extend network virtualization, to obtain a sufficient quantity of virtual networks, so as to meet a use requirement of a user.

A VXLAN of the data center usually includes a core device, a plurality of peer VXLAN tunnel endpoint (VTEP) devices, and virtual machines (VMs) separately connected to the VTEP devices. Generally, the VM may be deployed on a server connected to the VTEP device. A virtual network function (VNF) network element may be distributed on a plurality of VMs, and the plurality of VMs can implement a same network function and share a same service Internet Protocol (IP) address.

On a VXLAN network, when a plurality of VMs of a same VNF network element are connected to different VTEP devices, a routing loop is likely to occur when the VTEP devices each receive a packet from a network side and forward the packet. As a result, the packet cannot be correctly sent to the VM.

SUMMARY

Embodiments of this application provide a packet forwarding method and a network device. The network device groups routes in virtual routing forwarding (VRF) based on address types of the routes, so that the routes in the VRF table are divided into a local routing group and a remote routing group. When obtaining a tunnel identifier of a packet, the network device may determine that the packet is from a tunnel endpoint device. The network device forwards the packet based on the local routing group including only a local route in the VRF table, to prevent the packet from being forwarded to another tunnel endpoint device again. In other words, this avoids a routing loop and ensures normal packet forwarding.

A first aspect of this application provides a packet forwarding method, and the method includes after a network device receives a first packet, the network device may obtain a first tunnel identifier of the first packet, and the first tunnel identifier may be used to indicate whether the first packet is from a transmission tunnel. When the first tunnel identifier is a first value, the network device forwards the first packet based on a first routing group in a VRF table. The first routing group consists of one or more local routes, and each next-hop outbound interface of the one or more local routes is a local outbound interface. The VRF table further includes a second routing group, and the second routing group includes one or more remote routes whose next-hop outbound interfaces are remote outbound interfaces. That is, the first routing group may be referred to as a local routing group, and the second routing group may be referred to as a remote routing group. The first tunnel identifier is a first value indicating that the first packet is from the transmission tunnel. In other words, the network device may determine, based on the first tunnel identifier as the first value, that the first packet is forwarded by a peer tunnel endpoint device on a network side to the network device through the transmission tunnel. Therefore, the network device may forward the first packet based on the local routing group in the VRF table, to ensure that a route selected by the network device is a local route and avoid a case in which a remote route is selected.

In this solution, when the network device obtains a tunnel identifier of a packet, and determines, based on a value of the packet, that the packet is from a tunnel endpoint device serving as a source end of the tunnel, the network device forwards the packet based on the local routing group including only the local route in the VRF table, to prevent the packet from being forwarded to another tunnel endpoint device again. This avoids a routing loop and ensures normal packet forwarding.

Optionally, in a possible implementation, that when the first tunnel identifier in the first packet is a first value, the network device forwards the first packet based on a first routing group in a VRF table includes the network device searches the VRF table for first route mark information based on the first tunnel identifier in the first packet as the first value, to determine the first routing group corresponding to the first route mark information. The network device forwards the first packet based on the determined first routing group. For example, the network device selects a route from the first routing group to forward the first packet. The first route mark information may be used to mark the local route in the VRF table. All local routes in the VRF table correspond to the first route mark information. For example, the first route mark information may be located in a field in the VRF table. Therefore, the network device may determine, by determining whether a route in the VRF table corresponds to the first route mark information, whether the route is a route belonging to the first routing group, to determine the first routing group in the VRF table.

In this solution, the network device may implement loop-free forwarding of the first packet by using the first routing group, and determine the first routing group in the VRF table by searching for route mark information in the VRF table, so that the first packet from the transmission tunnel is forwarded based on the first routing group, thereby improving flexibility of implementing the solution.

Optionally, in a possible implementation, the network device has a load balancing capability. The method includes the network device further obtains a second tunnel identifier of a second packet, and the first packet and the second packet belong to same service traffic. In other words, a destination address of the first packet is the same as a destination address of the second packet. That the network device forwards the first packet based on a first routing group in a VRF table includes the network device determines a first route in the first routing group, and forwards the first packet based on the first route. The network device determines a second route in the first routing group based on the second tunnel identifier as the first value, and forwards the second packet based on the second route. The network device may determine, in the first routing group based on the destination address of the first packet and the destination address of the second packet, a plurality of routes that may be used to forward the first packet and the second packet, and then separately select, from the plurality of routes according to a load balancing policy, the first route used to forward the first packet and the second route used to forward the second packet, to forward the first packet and the second packet to different VMs for processing, implement load balancing between VMs, and avoid a case that some VMs are overloaded while some other VMs are idle.

Optionally, in a possible implementation, the method includes the network device obtains a third tunnel identifier of a third packet. When the third tunnel identifier is a second value, the network device searches for a route, based on the first routing group and the second routing group that are in the VRF table, to forward the third packet. That the third tunnel identifier is a second value indicates that the third packet is not from the transmission tunnel. The network device may determine that the third packet is from a local host based on the third tunnel identifier as the second value. Therefore, the network device may forward the third packet based on the first routing group and the second routing group that are in the VRF table. In other words, the network device forwards the third packet based on the local routing group and the remote routing group that are in the VRF table. In this case, because the third packet is from a user-side network, for example, the third packet is sent by user equipment, for example, a VM, the loop does not occur. Therefore, a route may be selected based on the first routing group and the second routing group, to implement load balancing of traffic between a local VM and a remote VM at the same time.

Optionally, in a possible implementation, the second routing group in the VRF table does not have mark information or corresponds to second route mark information. The second route mark information may be any mark information or any value that is different from the first route mark information. For example, in the VRF table, a field may be used to indicate the second route mark information. The field is a specific field corresponding to the remote route in the VRF table, and is used to indicate the second route mark information corresponding to the remote route. The field and the first route mark information may be located in a same field, and a value of the field corresponding to the second route mark information is different from a value of a field corresponding to the first route mark information. Alternatively, the field and a field corresponding to the first route mark information may belong to different fields. Alternatively, in the VRF table, only the first routing group has mark information, and the second routing group does not have the mark information.

Optionally, in a possible implementation, before the network device obtains the first tunnel identifier of the first packet, the method further includes the network device receives the first packet. The network device updates the first packet based on tunnel attribute information carried in the received first packet, and an updated first packet includes the first tunnel identifier corresponding to the tunnel attribute information. That the network device obtains a first tunnel identifier of the first packet includes the network device obtains the first tunnel identifier of the updated first packet. In other words, the first packet received by the network device carries the tunnel attribute information. After determining that the first packet carries the tunnel attribute information, the network device may update the first packet, so that the updated first packet includes the first tunnel identifier corresponding to the tunnel attribute information carried in the first packet. In this way, the network device can select the corresponding first routing group based on the first tunnel identifier when forwarding the first packet. The first tunnel identifier may be the same as the tunnel attribute information, or may be the same as a value of an indication field in the tunnel attribute information. Alternatively, the first tunnel identifier may be different from the tunnel attribute information, but there is a correspondence or the like between the first tunnel identifier and the tunnel attribute information.

Optionally, in a possible implementation, the tunnel attribute information is VXLAN tunnel attribute information, Multiprotocol Label Switching (MPLS) tunnel attribute information, or segment routing (SR) tunnel attribute information.

Optionally, in a possible implementation, the network device is a device connected to a plurality of virtual machines in a data center network.

A second aspect of this application provides a network device, including an obtaining unit, configured to obtain a first tunnel identifier of a first packet, and a processing unit, configured to forward the first packet based on a first routing group in a VRF table when the first tunnel identifier is a first value. The first routing group consists of one or more local routes, and each next-hop outbound interface of the one or more local routes is a local outbound interface. The VRF table further includes a second routing group, and the second routing group includes one or more remote routes whose next-hop outbound interfaces are remote outbound interfaces.

Optionally, in a possible implementation, the processing unit is further configured to search the VRF table for first route mark information based on the first tunnel identifier in the first packet as the first value, to determine the first routing group corresponding to the first route mark information, and forward the first packet based on the determined first routing group.

Optionally, in a possible implementation, the network device has a load balancing capability. The obtaining unit is further configured to obtain a second tunnel identifier of a second packet, and the first packet and the second packet belong to same service traffic. The processing unit is further configured to determine a first route in the first routing group, and forward the first packet based on the first route, and determine a second route in the first routing group based on the second tunnel identifier as the first value, and forward the second packet based on the second route.

Optionally, in a possible implementation, the obtaining unit is further configured to obtain a third tunnel identifier of a third packet. The processing unit is further configured to search, using the third tunnel identifier as a second value, for a route based on the first routing group and the second routing group that are in the VRF table, to forward the third packet.

Optionally, in a possible implementation, the second routing group in the VRF table does not have mark information or corresponds to second route mark information.

Optionally, in a possible implementation, the obtaining unit is further configured to receive the first packet. The processing unit is further configured to update the first packet based on tunnel attribute information carried in the received first packet, and an updated first packet includes the first tunnel identifier corresponding to the tunnel attribute information.

Optionally, in a possible implementation, the tunnel attribute information is VXLAN tunnel attribute information, MPLS tunnel attribute information, or SR tunnel attribute information.

Optionally, in a possible implementation, the network device is a device connected to a plurality of virtual machines in a data center network.

A third aspect of this application provides a network device. The network device includes a processor and a memory. The memory is configured to store an instruction. The processor is configured to execute the instruction in the memory, so that the network device performs the method according to any one of the possible implementations of the first aspect.

A fourth aspect of this application provides a network device. The network device includes a processor. The processor is coupled to a memory. The processor is configured to execute an instruction in the memory, so that the network device performs the method according to any one of the possible implementations of the first aspect.

A fifth aspect of this application provides a computer storage medium. The computer storage medium may be non-volatile. The computer storage medium stores a computer-readable instruction, and when the computer-readable instruction is executed by a processor, the method in any design in the first aspect is implemented.

A sixth aspect of this application provides a computer program product including an instruction. When the computer program product is run on a computer, the computer is enabled to perform the method in any design of the first aspect.

A seventh aspect of this application provides a chip system. The chip system includes a processor, configured to support a network device in implementing functions in the foregoing aspects, for example, sending or processing data and/or information in the foregoing method. In a possible design, the chip system further includes a memory. The memory is configured to store a necessary program instruction and necessary data of the network device. The chip system may include a chip, or may include a chip and another discrete device.

The foregoing technical solutions of the embodiments of this application provide various advantages.

The embodiments of this application provide the packet forwarding method and the network device. The network device groups the routes in the VRF based on the address types of the routes, so that the routes in the VRF table are divided into the local routing group and the remote routing group. When obtaining the tunnel identifier of the packet, the network device may determine whether the packet is from the tunnel endpoint device based on a value of the tunnel identifier. When the packet is from the tunnel endpoint device, the network device forwards the packet based on the local routing group including only the local route in the VRF table, to prevent the packet from being forwarded to the other tunnel endpoint device again. This prevents the routing loop and ensures the normal packet forwarding.

BRIEF DESCRIPTION OF DRAWINGS

FIG. 5 is a schematic flowchart of a packet forwarding method according to an embodiment of this application;

FIG. 6 is a schematic flowchart of a packet forwarding method according to an embodiment of this application;

DESCRIPTION OF EMBODIMENTS

Figure 1:
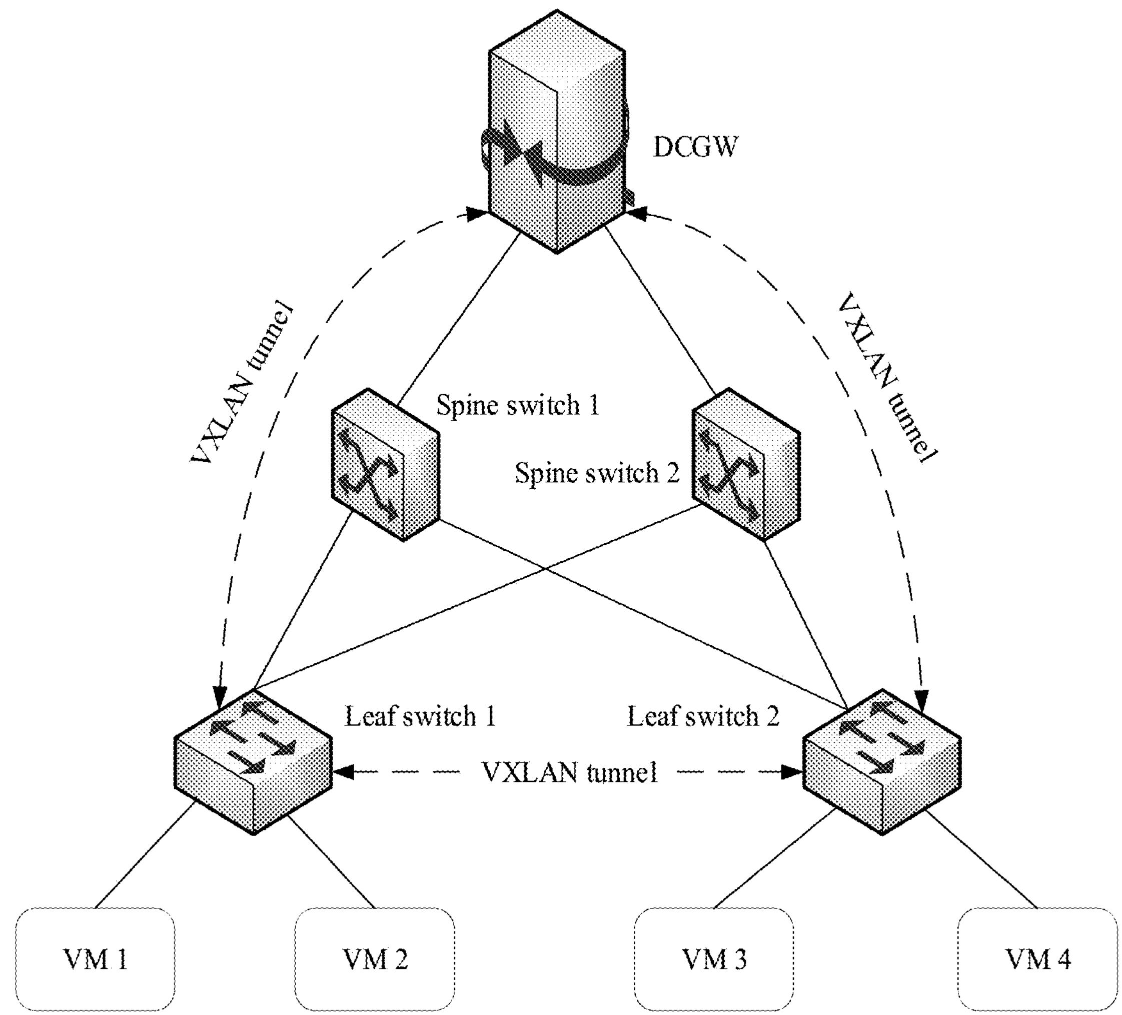
FIG. 1 is a schematic diagram of networking of a data center according to an embodiment of this application.

To make objectives, technical solutions, and advantages of this application clearer, the following describes embodiments of this application with reference to accompanying drawings. It is clear that, the described embodiments are certain examples of the embodiments of this application. A person of ordinary skill in the art may learn that, as a new application scenario emerges, the technical solutions provided in the embodiments of this application are also applicable to a similar technical problem.

In this specification, claims, and the accompanying drawings of this application, the terms “first”, “second”, and the like are intended to distinguish similar objects but do not necessarily indicate a specific order or sequence. It should be understood that the data termed in such a way is interchangeable in a proper circumstance, so that the embodiments described herein can be implemented in other orders than the order illustrated or described herein. In addition, the terms “include”, “contain” and any other variants mean to cover the non-exclusive inclusion, for example, a process, method, system, product, or device that includes a list of steps or modules is not necessarily limited to the expressly listed steps or modules, but may include other steps or modules not expressly listed or inherent to such a process, method, product, or device. Names or numbers of the steps in this application do not mean that the steps in the method procedure need to be performed in a chronological/logical order indicated by the names or numbers. An execution sequence of the steps in the procedure that have been named or numbered may be changed based on technical objectives to be implemented, provided that a same or similar technical effect can be achieved. Division into units in this application is logical division and may be other division in an actual implementation. For example, a plurality of units may be combined or integrated into another system, or some features may be ignored or not performed. In addition, the displayed or discussed mutual couplings or direct couplings or communications connections may be implemented through some interfaces. The indirect couplings or communications connections between the units may be implemented in electronic or other forms. This is not limited in this application. In addition, units or subunits described as separate parts may or may not be physically separate, may or may not be physical units, or may be distributed in a plurality of circuit units. Some or all of the units may be selected based on actual requirements to achieve the objectives of the solutions of this application.

In conventional mobile communications networks such as a $2^{nd}$ generation (2G) communications network, a $3^{rd}$ generation (3G) communications network, and a $4^{th}$ generation (4G) communications network, most telecommunications devices each use a dedicated platform structure. In other words, software and hardware of different telecommunications devices are independent of each other. For example, in a 4G network system, a mobility management entity (MME), a serving gateway (S-GW), a packet data network gateway (P-GW), and the like are separately carried by independent frame-type devices or box-type devices. These devices cannot be shared at a software layer and a hardware layer. In other words, if MME load is low in an equipment room, an MME board cannot be removed and inserted into a to-be-overloaded S-GW network element.

With an integrated delivery and large-scale deployment of a data center, and increasing maturity of the $5^{th}$ generation (5G) communications technology, a network functions virtualization (NFV) technology, and a cloud technology, a telecommunications network element is gradually migrating from a dedicated hardware platform to a universal hardware platform in the data center, and deployed on a VM of a server in the data center in a form of a VNF network element, to form a telecommunications cloud data center network.

Currently, in the data center, there are features such as centralized data exchange and increasing east-west traffic, and a requirement for a data center network is further improved. To adapt to the foregoing changes, the data center network transforms from a conventional virtual local area network (VLAN) to a VXLAN network and a software-defined networking (SDN), to implement adaptation and association between the network and a service, and improve resource utilization efficiency and service provisioning efficiency. The VXLAN is a network virtualization technology in which a data packet sent from a source host is encapsulated into a User Datagram Protocol (UDP), an IP and media access control (MAC) of a physical network are used as an outer header for encapsulation, and then the data packet is transmitted over the network. After the data packet reaches a destination, a tunnel endpoint decapsulates the data packet and sends data to a target host. The VXLAN technology may be used to construct a layer 2 virtual network on an existing layer 3 network, to implement layer 2 communication between VMs.

For details, refer to FIG. 1. FIG. 1 is a schematic diagram of networking of a data center according to an embodiment of this application. In the data center, typical VXLAN networking may include a data center gateway (DCGW), a spine switch, a leaf switch, and a VM. The DCGW may be connected to one or more spine switches, the spine switch may be connected to one or more leaf switches, and the leaf switch may be connected to one or more VMs. A VXLAN tunnel may be established between the DCGW and the leaf switch, and a VXLAN tunnel may also be established between leaf switches.

For ease of understanding, the following explains terms used on a VXLAN network.

A VTEP device is a network device that can encapsulate and decapsulate a VXLAN packet. A source IP address of the VXLAN packet is an IP address of a source end VTEP device, and a destination IP address of the VXLAN packet is an IP address of a destination end VTEP device. One pair of VTEP addresses corresponds to one VXLAN tunnel. After encapsulating the packet, the source end VTEP device sends the encapsulated packet to the destination end VTEP device through a tunnel, and then the destination end VTEP device decapsulates the received encapsulated packet. The leaf switch device in FIG. 1 may have a capability of encapsulating and decapsulating the VXLAN packet. That is, the leaf switch device in FIG. 1 is a VTEP device.

A network virtualization edge (NVE) device is a network entity that implements a network virtualization function. After a packet is encapsulated and converted by the NVE device, a layer 2 virtual network may be established between NVE devices based on a layer 3 underly network. The leaf switch device in FIG. 1 is an NVE device. The VTEP device is a type of the NVE device.

A layer 2 gateway (L2GW) is similar to a layer 2 access device of a conventional network. On the VXLAN network, the L2GW allows a tenant to access a VXLAN virtual network and allows communication between subnets on a same VXLAN network.

A concept of a layer 3 gateway (L3GW) is introduced to perform communication between VXLAN networks and communication between the VXLAN network and a non-VXLAN network. The L3GW may be used for cross-subnet communication of the VXLAN network and external network access. The leaf switch in FIG. 1 may be used as an L2GW or an L3GW, or may be used as both an L2GW and L3GW. In other words, the leaf switch may be the L2GW/L3GW.

Generally, traffic of a data center network may be divided into north-south traffic and east-west traffic. The north-south traffic refers to traffic from an external network to the data center network and traffic from the data center network to the external network. When the north-south traffic is transmitted in a data center, one endpoint of a VXLAN tunnel is at the DCGW, and the other endpoint is at the leaf switch. In other words, the traffic is transmitted from the DCGW to the leaf switch or from the leaf switch to the DCGW. The east-west traffic refers to traffic between VMs in the data center. When the east-west traffic is transmitted in the data center, both the endpoints of the VXLAN tunnel are at leaf switches. In other words, the traffic is generally transmitted from one leaf switch to the other leaf switch. When traffic flows from the DCGW to a leaf switch or from another leaf switch to a leaf switch, the traffic belongs to traffic flowing from a network side. When traffic flows from a user-side device or a user network to a leaf switch, for example, the traffic flows from a VM mounted to the leaf switch to the leaf switch, the traffic belongs to traffic flowing from a user side.

Figure 2A:
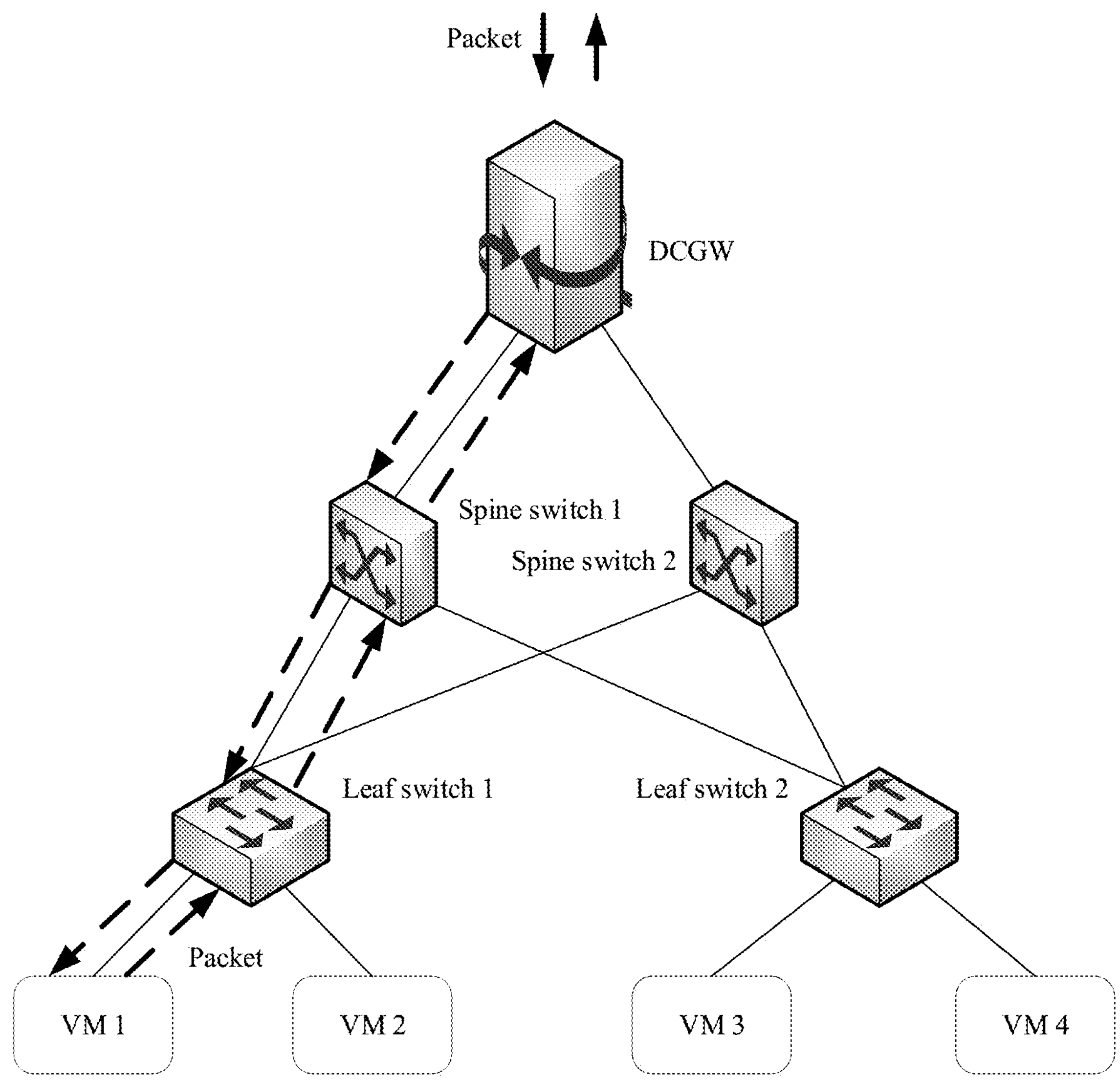
FIG. 2A is a schematic diagram of north-south traffic according to an embodiment of this application.

For details, refer to FIG. 2A. FIG. 2A is a schematic diagram of north-south traffic according to an embodiment of this application. As shown in FIG. 2A, a packet entering a data center from an external network is forwarded by a DCGW to a leaf switch 1 by using a spine switch 1, and is finally forwarded by the leaf switch 1 to a VM 1 connected to the leaf switch 1. Similarly, the VM 1 sends a packet generated by the VM 1 to the leaf switch 1, the leaf switch 1 forwards the packet to the DCGW by using the spine switch 1, and finally the DCGW sends the packet to the external network. Both traffic from the DCGW to the VM 1 and traffic from the VM 1 to the DCGW may be referred to as the north-south traffic.

Figure 2B:
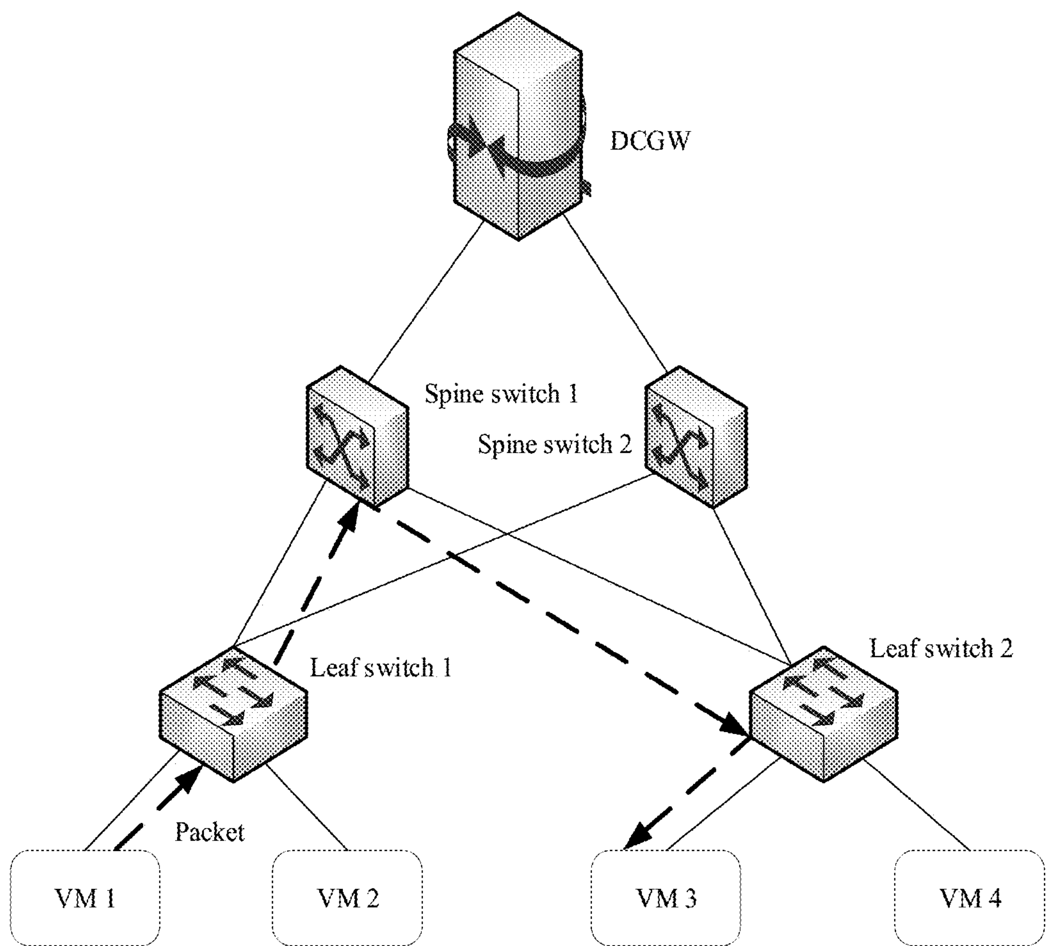
FIG. 2B is a schematic diagram of east-west traffic according to an embodiment of this application.

FIG. 2B is a schematic diagram of east-west traffic according to an embodiment of this application. As shown in FIG. 2B, a VM 1 sends a packet generated by the VM 1 to a leaf switch 1, the leaf switch 1 forwards the packet to a leaf switch 2 by using a spine switch 1, and finally the leaf switch 2 sends the packet to a VM 3. Traffic from the VM 1 to the VM 3 may be referred to as the east-west traffic.

Generally, when an SDN is deployed on a VXLAN network, a leaf switch can implement shortest-path forwarding for east-west traffic between two VMs in different subnets. A spine switch forwards the traffic to the other nearest VM, to prevent inter-subnet traffic from being diverted to a DCGW and form a traffic bottleneck.

Figure 3:
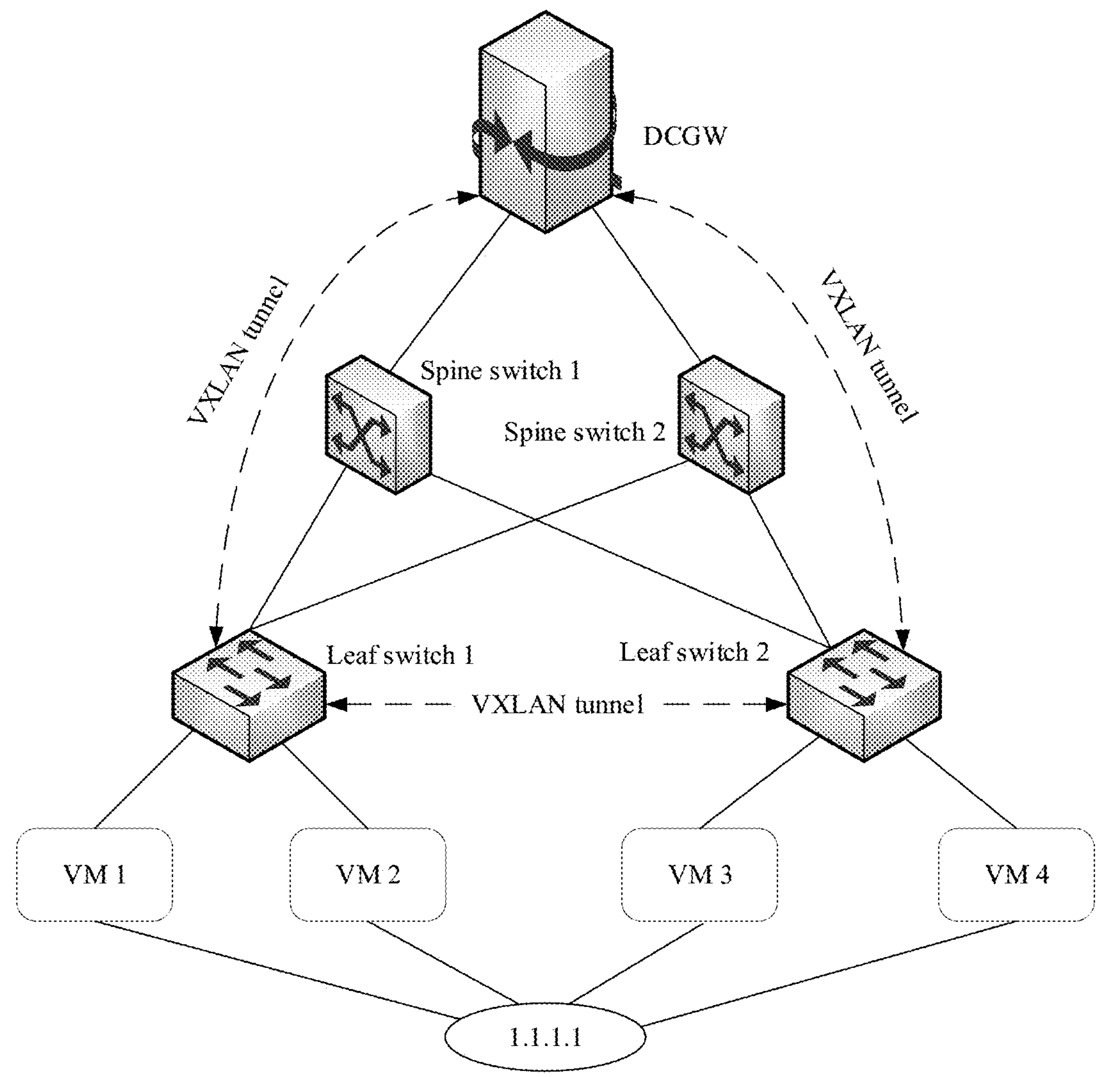
FIG. 3 is a schematic diagram of a service scenario according to an embodiment of this application.

In the data center network, a VM can be deployed randomly. Under a specific condition, the VM can even be dynamically migrated. In this way, when a VNF network element is distributed on a plurality of VMs, the plurality of VMs share a same IP address, and the plurality of VMs may be deployed on different racks. In other words, the plurality of VMs are connected to different leaf switches. FIG. 3 is a schematic diagram of a service scenario according to an embodiment of this application. A VNF network element is distributed on a VM 1 to a VM 4, and the VM 1 to the VM 4 may share a same IP address (the IP address may be, for example, 1.1.1.1). The VM 1 and the VM 2 are connected to a leaf switch 1, and the VM 3 and the VM 4 are a connected to a leaf switch 2. In this way, when the leaf switch 1 forwards a packet whose IP address is 1.1.1.1, a corresponding next hop may be a local VM, or may be a remote VM. Herein, a route whose next hop is the local VM of the leaf switch 1 is referred to as a local route, and a route whose next hop is the remote VM is referred to as a remote route. The remote VM is, for example, a VM mounted to another leaf switch different from the leaf switch 1.

Further, for the leaf switch 1 shown in FIG. 3, a VRF table of the leaf switch 1 may be:

prefix: 1.1.1.1 next hop: VM 1 (local)
(—prefix: 1.1.1.1 next hop: VM 1 (local))
prefix: 1.1.1.1 next hop: VM 2 (local)
(—prefix: 1.1.1.1 next hop: VM 2 (local))
prefix: 1.1.1.1 next hop: VM 3 (remote)
prefix: 1.1.1.1 nexthop: VM 3 (remote)
prefix: 1.1.1.1 next hop: VM 4 (remote)
(—prefix: 1.1.1.1 next hop: VM 4 (remote))

In other words, when the prefix (namely, a destination address) is 1.1.1.1, next-hop routes corresponding to the leaf switch 1 include two local routes (the next hops are the VM 1 and the VM 2) and two remote routes (the next hops are the VM 3 and the VM 4).

For the leaf switch 2 shown in FIG. 3, a VRF table of the leaf switch 2 may be:

prefix: 1.1.1.1 next hop: VM 1 (remote)
(—prefix: 1.1.1.1 next hop: VM 1 (remote))
prefix: 1.1.1.1 next hop: VM 2 (remote)
(—prefix: 1.1.1.1 next hop: VM 2 (remote))
prefix: 1.1.1.1 next hop: VM 3 (local)
(—prefix: 1.1.1.1 next hop: VM 3 (local))
prefix: 1.1.1.1 next hop: VM 4 (local)
(—prefix: 1.1.1.1 next hop: VM 4 (local))

Similarly, when the prefix (namely, the destination address) is 1.1.1.1, next-hop routes corresponding to the leaf switch 2 include two remote routes (the next hops are the VM 1 and the VM 2) and two local routes (the next hops are the VM 3 and the VM 4).

Generally, to implement VM-based load balancing of the VNF network element, in other words, a plurality of VMs evenly share a service of the VNF network element, a local route and a remote route are equivalent on a leaf switch. In other words, when the leaf switch forwards a packet corresponding to an IP address, the leaf switch may equivalently select one of a plurality of local routes and/or remote routes corresponding to the IP address, and forward the packet based on the selected route.

In this way, when a plurality of VMs that share a same IP address are connected to different leaf switches, a routing loop is likely to occur. Further, when the leaf switch 1 receives a packet whose destination address is 1.1.1.1, the leaf switch 1 selects the VM 3 or the VM 4 from the VM 1 to the VM 4 as a next-hop route. Because the VM 3 and the VM 4 are connected to the leaf switch 2, the leaf switch 1 forwards the packet to the leaf switch 2 by using the spine switch 1. When the leaf switch 2 receives the packet forwarded by the spine switch 1, the leaf switch 2 may select the VM 1 or the VM 2 as a next-hop route. Therefore, the leaf switch 2 forwards the packet to the leaf switch 1 by using a spine switch 2. In other words, the packet is always forwarded between the leaf switch 1 and the leaf switch, and cannot reach the destination address, causing the routing loop.

Figure 4:
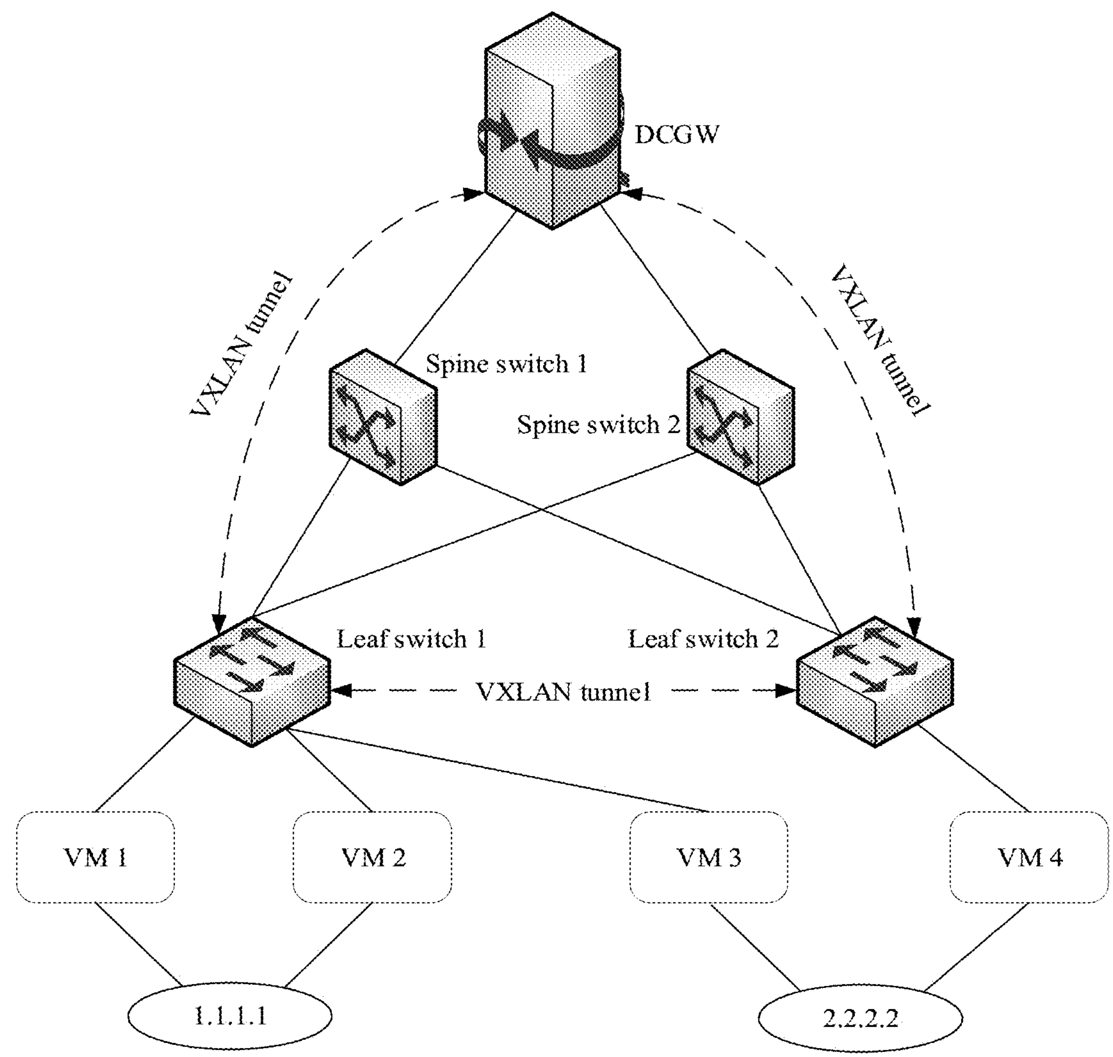
FIG. 4 is a schematic diagram of another scenario according to an embodiment of this application.

In addition, if the leaf switch preferably selects the local route to forward a packet, packet forwarding pressure is centralized on the local VM although the loop can be resolved. As a result, it is difficult to implement load balancing of an entire network. FIG. 4 is a schematic diagram of another scenario according to an embodiment of this application. A VNF network element 1 is distributed on a VM 1 and a VM 2, and the VM 1 and the VM 2 share an IP address 1.1.1.1. A VNF network element 2 is distributed on a VM 3 and a VM 4, and the VM 3 and the VM 4 share an IP address 2.2.2.2. The VM 1 to the VM 3 are connected to a leaf switch 1, and the VM 4 is connected to a leaf switch 2.

In this case, for the leaf switch 1 shown in FIG. 4, a VRF table of the leaf switch 1 may be:

prefix: 1.1.1.1 next hop: VM 1 (local)
(—prefix: 1.1.1.1 next hop: VM 1 (local))
prefix: 1.1.1.1 next hop: VM 2 (local)
(—prefix: 1.1.1.1 next hop: VM 2 (local))
prefix: 2.2.2.2 next hop: VM 3 (local)
(—prefix: 2.2.2.2 next hop: VM 3 (local))
prefix: 2.2.2.2 next hop: VM 4 (remote)
(—prefix: 2.2.2.2 next hop: VM 4 (remote))

For the leaf switch 2 shown in FIG. 4, a VRF table of the leaf switch 2 may be:

prefix: 1.1.1.1 next hop: VM 1 (remote)
prefix: 1.1.1.1 nexthop: VM 1 (remote)
prefix: 1.1.1.1 next hop: VM 2 (remote)
(—prefix: 1.1.1.1 next hop: VM 2 (remote))
prefix: 2.2.2.2 next hop: VM 3 (remote)
(—prefix: 2.2.2.2 next hop: VM 3 (remote))
prefix: 2.2.2.2 next hop: VM 4 (local)
(—prefix: 2.2.2.2 next hop: VM 4 (local))

In this embodiment, information in the foregoing VRFs is intended to describe the application scenario of this embodiment more clearly. It can be understood that, in an actual application, content and a style of the information presented in the VRF tables may be designed as required. In the scenario shown in FIG. 4, if a leaf switch preferably selects a local route when forwarding a packet, when the leaf switch 1 receives a packet sent by the VM 1 or the VM 2, and a destination address of the packet is 2.2.2.2, the leaf switch 1 always selects to forward the packet to the local VM 3 according to a rule of preferably selecting a local route. As a result, the VM 3 is always in a heavy-load state while the VM 4 is always in an idle state. In this way, load balancing cannot be implemented.

The foregoing description uses a network structure shown in FIG. 1 as an example. It may be understood that a possible structure of the data center network is not limited thereto. For example, the data center network may alternatively not include a spine switch, or a layer 2 leaf switch is further connected to a leaf switch, and then the layer 2 leaf switch is mounted to VM user equipment, and the like. The layer 2 leaf switch may also be understood as a user-side device. However, in different network structures, the foregoing problem may still exist.

In view of this, an embodiment of this application provides a packet forwarding method. A network device groups routes in a VRF based on address types of the routes, so that the routes in the VRF table are divided into a local routing group and a remote routing group. When obtaining a tunnel identifier of a packet, the network device may determine that the packet is from a tunnel endpoint device, for example, a DCGW on a network side or another leaf switch different from the network device. The network device forwards the packet based on the local routing group including only a local route in the VRF table, to prevent the packet from being forwarded to another tunnel endpoint device again. This avoids a routing loop and ensures normal packet forwarding.

The packet forwarding method provided in this embodiment of this application may be applied to a network architecture in which a VXLAN tunnel is deployed and that is shown in FIG. 3 or FIG. 4, or may be applied to a network architecture in which another transmission tunnel is deployed (for example, an MPLS tunnel or an SR tunnel is deployed). This is not limited herein.

FIG. 5 is a schematic flowchart of a packet forwarding method 500 according to an embodiment of this application. As shown in FIG. 5, the packet forwarding method 500 provided in the embodiment of this application includes the following steps.

Step 501. A network device receives a first tunnel identifier of a first packet.

In this embodiment, the network device establishes a transmission tunnel with another network device in a network. For example, the network device establishes a VXLAN tunnel, an MPLS tunnel, or an SR tunnel with the other network device. As a tunnel endpoint device, the network device may receive the first packet sent by another tunnel endpoint device, and forward the first packet. The first packet is from a transmission tunnel established between the network device and the other tunnel endpoint device. The first packet from the transmission tunnel includes the first tunnel identifier. The network device may obtain the first tunnel identifier of the first packet. The first tunnel identifier may be used to indicate tunnel attribute of the first packet. In other words, the first tunnel identifier may be used to indicate whether the first packet is from the transmission tunnel, for example, the first packet from a network side is sent to the network device by using a peer tunnel endpoint device DCGW. In other words, when the first packet is from the transmission tunnel, after obtaining the first tunnel identifier of the first packet, the network device may determine, based on the first tunnel identifier, that the first packet is forwarded by the other tunnel endpoint device to the network device through the transmission tunnel, and that the first packet continues to be forwarded by the network device.

In a possible implementation, the network device may be a device connected to one or more VMs in a data center network. For example, the network device may be an access switch (for example, a leaf switch) or an access router connected to a server on which the one or more VMs are deployed. The network device may receive a packet sent by another device, and forward the packet to a VM connected to the network device. The network device may alternatively receive a packet sent by a VM connected to the network device, and forward the packet to another device. FIG. 3 or FIG. 4 is used as an example. The network device may be the leaf switch 1, and the other device may be the leaf switch 2. Alternatively, the network device may be the spine switch 1, and the other device may be the spine switch 2.

When the network device is the access switch, the first packet may be forwarded by the DCGW to the network device through a transmission tunnel between the network device and the DCGW, or the first packet may be forwarded by another access switch to the network device through a transmission tunnel between the other access switch and the network device. Herein, a device that sends the first packet to the network device is not uniquely limited.

Step 502. When the first tunnel identifier is a first value, the network device forwards the first packet based on a first routing group in a VRF table.

The first routing group includes only one or more local routes whose next-hop outbound interfaces are local outbound interfaces. The local route is used to reach a user-side device mounted to the network device, for example, a route of a VM mounted to the network device. The first routing group does not include a remote route whose next-hop outbound interface is a remote outbound interface, in other words, the first routing group is actually a local routing group. In addition, the VRF table further includes a second routing group. The second routing group includes one or more remote routes whose next-hop outbound interfaces are remote outbound interfaces, in other words, the second routing group is a remote routing group. Simply speaking, routes in the VRF table can be divided into two routing groups based on types of next hops. A route whose next-hop outbound interface is a local outbound interface belongs to the first routing group, and a route whose next-hop outbound interface is a remote outbound interface belongs to the second routing group.

In this embodiment, a value of the first tunnel identifier of the first packet obtained by the network device is the first value, and that the first tunnel identifier is the first value may indicate that the first packet is from the transmission tunnel. In other words, the network device may determine, based on the first tunnel identifier as the first value, that the first packet is forwarded by the other tunnel endpoint device to the network device through the transmission tunnel. Therefore, the network device may forward the first packet based on the first routing group in the VRF table, in other words, the network device forwards the first packet based on the local routing group in the VRF table.

In this way, when the first tunnel identifier of the first packet is the first value, the network device forwards the first packet based on the local routing group including only the local route in the VRF table, so that the network device can forward the first packet to a local host. In other words, the first packet forwarded by the other tunnel endpoint device to the network device is not forwarded to another tunnel endpoint device again. This prevents a routing loop and ensures normal forwarding of the first packet.

In a possible implementation, that the network device forwards the first packet based on a first routing group in a VRF table may include the network device searches the VRF table for first route mark information based on the first tunnel identifier of the first packet as the first value, to determine the first routing group corresponding to the first route mark information. Then, the network device forwards the first packet based on the determined first routing group. To be specific, the network device may determine, in the first routing group based on a destination address of the first packet, a route used to forward the first packet, and further forward the first packet based on the route.

The first route mark information may be used to mark the local route in the VRF table. All local routes in the VRF table correspond to the first route mark information. Therefore, the network device may determine, by determining whether a route in the VRF table corresponds to the first route mark information, whether the route is a route belonging to the first routing group, to determine the first routing group in the VRF table.

Optionally, in a possible implementation, a specified field may be used to indicate the first route mark information in the VRF table. For example, a specific field corresponding to the local route is added to the VRF table to indicate the first route mark information corresponding to the local route. For example, a "flag" field is added to the VRF table, and when a value of the "flag" field is "1", the "flag" field indicates the first route mark information. Further, a VRF table that uses the added "flag" field to indicate the first route mark information may be shown as follows:

prefix: 1.1.1.1 next hop: VM 1 flag: 1 (local)
(—prefix: 1.1.1.1 next hop: VM 1 flag: 1 (local))
prefix: 1.1.1.1 next hop: VM 2 flag: 1 (local)
(—prefix: 1.1.1.1 next hop: VM 2 flag: 1 (local))
prefix: 1.1.1.1 next hop: VM 3 (remote)
(—prefix: 1.1.1.1 next hop: VM 3 (remote))
prefix: 1.1.1.1 next hop: VM 4 (remote)
(—prefix: 1.1.1.1 next hop: VM 4 (remote))

It can be seen that the "flag" field is added to the local route in the VRF table, and when the value of the "flag" field is 1, it indicates that a route corresponding to the "flag" field is the local route. In other words, the "flag" field with the value of 1 is used to indicate the first route mark information. In this way, the network device may determine the local route corresponding to the "flag" field in the VRF table by searching a "flag" field whose value is 1 in the VRF table, to determine the first routing group in the VRF table.

In the foregoing implementation, in the VRF table, the first route mark information is indicated by using the value 1 of the "flag" field. This is used as a specific example. In another possible implementation, another value may be assigned to the "flag" field in the VRF table, or another possible existing or added field is used to indicate the first route mark information. The network device may determine the local route in the VRF table by searching the VRF table for a route corresponding to the specified field.

In addition, for the second routing group in the VRF table, the second routing group may not have mark information or may correspond to second route mark information. In other words, the route in the second routing group may not have the mark information, or the route in the second routing group has the second route mark information.

It may be understood that when the first routing group has the first route mark information, but the second routing group does not have the mark information, the network device may determine the first routing group and the second routing group that are in the VRF table by determining whether a route in the VRF table has the mark information. For example, the network device may determine, by determining whether a route in the VRF table has the specified field, a routing group to which the route belongs. To be specific, a route that has the specified field belongs to the first routing group, and a route that does not have the specified field belongs to the second routing group.

It may be understood that the first routing group and the second routing group may be distinguished in any other possible form, provided that the network device can determine the first routing group based on at least the form.

When the first routing group has the first route mark information, but the second routing group does not have the mark information, the network device may determine the first routing group and the second routing group that are in the VRF table by determining specific route mark information in the VRF table. The second route mark information may be any value or any field different from the first route mark information, so that the network device can identify the first route mark information or the second route mark information in the route. For example, an added field may also be used to indicate the second route mark information in the VRF table. In other words, a specific field corresponding to the remote route is added in the VRF table to indicate the second route mark information corresponding to the remote route. For example, a "flag" field may be added to the VRF table, and when a value of the "flag" field is "0", the "flag" field indicates the second route mark information. In other words, when the value of the added "flag" field in the route is "0", the "flag" field indicates the second route mark information. When the value of the added "flag" field in the route is "1", the "flag" field indicates the first route mark information. The network device may determine, based on the value of the "flag" field, whether a route in the VRF table belongs to the first routing group or the second routing group.

Further, a VRF table that uses the added "flag" field to indicate the first route mark information and the second route mark information may be shown as follows:

prefix: 1.1.1.1 next hop: VM 1 flag: 1 (local)
prefix: 1.1.1.1 nexthop: VM 1 flag: 1 (local)
prefix: 1.1.1.1 next hop: VM 2 flag: 1 (local)
(—prefix: 1.1.1.1 next hop: VM 2 flag: 1 (local))
prefix: 1.1.1.1 next hop: VM 3 flag: 0 (remote)
(—prefix: 1.1.1.1 next hop: VM 3 flag: 0 (remote))
prefix: 1.1.1.1 next hop: VM 4 flag: 0 (remote)
(—prefix: 1.1.1.1 next hop: VM 4 flag: 0 (remote))

It can be seen that the "flag" field is added to the local route in the VRF table, and when the value of the "flag" field is 1, it indicates that a route corresponding to the "flag" field is the local route. When the value of the flag field is 0, it indicates that the route corresponding to the "flag" field is the remote route. In this way, the network device may determine the local route and the remote route in the VRF table by determining the value of the "flag" field in the VRF table, to determine the first routing group and the second routing group in the VRF table.

Optionally, in a possible implementation, when the network device has a load balancing capability, when forwarding a packet whose tunnel identifier is the first value based on the first routing group, the network device may further determine, according to a preconfigured load balancing policy, a route for forwarding the packet.

For example, the network device receives the first packet and a second packet, the first tunnel identifier of the first packet is the first value, and a second tunnel identifier of the second packet is also the first value. That is, the network device may obtain the first tunnel identifier whose value is the first value and the second tunnel identifier whose value is the first value. The first packet and the second packet belong to traffic corresponding to a same service, in other words, the destination address of the first packet and a destination address of the second packet are the same. When the network device forwards the first packet based on the first routing group, the network device may determine, based on the destination address of the first packet, an equal-cost multi-path routing (ECMP) group corresponding to the first packet in the first routing group. Then, the network device determines a route used to forward the first packet in the ECMP group according to the load balancing policy, and forwards the first packet based on the determined route. The ECMP group represents a routing group that may be used to forward the first packet, and destination addresses corresponding to routes in the ECMP group are the same. In other words, the destination addresses of the routes in the ECMP group correspond to the destination address of the first packet, and next-hop outbound interfaces of the routes in the ECMP group are different. Similarly, when the network device forwards the second packet, the network device may determine, based on the destination address of the second packet, a same ECMP group corresponding to the second packet in the first routing group. Then, the network device determines, according to the load balancing policy, a route used to forward the second packet in the ECMP group corresponding to the second packet, and forwards the second packet based on the determined route.

For example, when forwarding the first packet, the network device selects, from the ECMP group according to the load balancing policy, the first route as the route used to forward the first packet, and forwards the first packet based on the first route. For example, the network device forwards the first packet to the VM 1. When forwarding the second packet, the network device selects, from the ECMP group according to the same load balancing policy, the second route as the route used to forward the second packet, and forwards the second packet based on the second route. For example, the network device forwards the second packet to the VM 2. The VM 1 and the VM 2 share a same IP address. In this way, when the destination address of the first packet and the destination address of the second packet are the same, the network device may forward, according to the load balancing policy, the first packet and the second packet to different VMs for processing, to implement load balancing between the VMs, and prevent a case that some VMs are overloaded while other VMs are idle.

The foregoing describes a process in which the network device forwards the packet whose tunnel identifier is the first value. The following describes in detail a process in which the network device forwards a packet whose tunnel identifier is not the first value.

FIG. 6 is a schematic flowchart of a packet forwarding method 600 according to an embodiment of this application. As shown in FIG. 6, the packet forwarding method 600 provided in this embodiment of this application includes the following steps.

Step 601. The network device obtains a third tunnel identifier of a third packet.

Further, after the network device receives the third packet, the network device may obtain the third tunnel identifier of the third packet.

Step 602. Based on the third tunnel identifier as a second value, the network device searches for a route based on the first routing group and the second routing group that are in the VRF table, to forward the third packet.

In this embodiment, a value of the third tunnel identifier of the third packet obtained by the network device is the second value, and that the third tunnel identifier is the second value may indicate that the third packet is not from the transmission tunnel. In other words, that the third tunnel identifier is the second value may indicate that the third packet is from a user side. For example, when the third packet received by the network device is sent by a local VM mounted to the network device, the value of the third tunnel identifier of the third packet is the second value.

In other words, the network device may determine, based on the third tunnel identifier as the second value, that the third packet that needs to be forwarded is from a local host or user equipment (for example, a VM mounted to the network device). Therefore, the network device may forward the third packet based on the first routing group and the second routing group that are in the VRF table. In other words, the network device forwards the third packet based on the local routing group and the remote routing group in the VRF table.

That the network device searches for a route, based on the first routing group and the second routing group that are in the VRF table, to forward the third packet may be the network device searches, based on a destination address of the third packet, the VRF table for routes corresponding to the third packet, namely, routes whose prefixes are the same as the destination address of the third packet. Then, the network device selects a route from the found routes, to forward the third packet. It may be understood that, when routes in the VRF table are divided into the first routing group and the second routing group, routes in the first routing group and the second routing group are all routes in the VRF table. Therefore, the network device may directly forward the third packet based on the routes in the VRF table. In other words, the network device may no longer need to determine the first routing group and the second routing group in the VRF table.

In this embodiment, when receiving the third packet from, for example, the user side, the network device implements packet forwarding based on a local route and a remote route in the VRF table, to ensure that the third packet can be evenly forwarded to the local VM and the remote VM for processing. This avoids a case that some VMs are overloaded while other VMs are idle, and realizes proper VM resource utilization.

The foregoing describes in detail a process in which the network device forwards a packet based on a tunnel identifier of the packet. For ease of understanding, the following describes in detail a process in which the network device obtains the tunnel identifier of the packet in the embodiment corresponding to FIG. 5 and the embodiment corresponding to FIG. 6.

The embodiment corresponding to FIG. 5 is used as an example. Before the network device obtains the first tunnel identifier of the first packet, the method 500 may further include the network device receives the first packet, and updates the first packet based on tunnel attribute information carried in the received first packet. An updated first packet includes the first tunnel identifier corresponding to the tunnel attribute information. In other words, the first packet received by the network device carries the tunnel attribute information. After determining that the first packet carries the tunnel attribute information, the network device may update the first packet, so that the updated first packet includes the first tunnel identifier corresponding to the tunnel attribute information carried in the first packet. In this way, the network device can select the corresponding first routing group based on the first tunnel identifier when forwarding the first packet.

Figure 7:
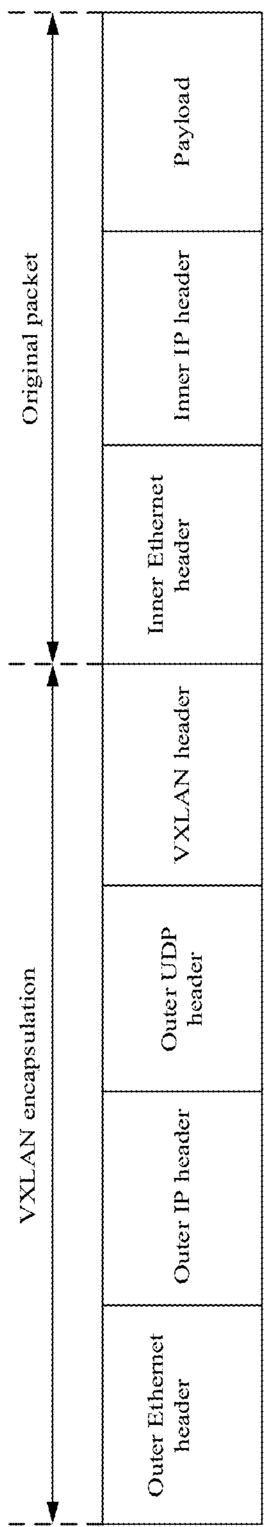
FIG. 7 is a schematic diagram of encapsulation of a VXLAN tunnel packet according to an embodiment of this application.

It may be understood that when a tunnel endpoint device transmits a packet through a tunnel, the tunnel endpoint device used as a source endpoint performs tunnel encapsulation on the packet, and the encapsulated packet carries tunnel attribute information. Therefore, after decapsulating the packet from the tunnel, the network device may determine that the packet carries the tunnel attribute information. Further, a VXLAN tunnel is used as an example. FIG. 7 is a schematic diagram of encapsulation of a VXLAN tunnel packet according to an embodiment of this application. As shown in FIG. 7, an original packet includes a payload, an inner IP header, and an inner Ethernet header. After VXALN tunnel encapsulation is performed on the packet, a VXLAN header is added to the packet, and a standard UDP header is in front of the VXLAN header. Therefore, the packet includes an outer Ethernet header, an outer IP header, and an outer UDP header. The VXLAN header in the packet or some data bits in the VXLAN header may be used as tunnel attribute information, to identify that the packet is from a VXLAN tunnel. Optionally, after decapsulating the packet and determining that the packet is from the tunnel, a network device may retain some data bits in the packet, to mark a tunnel attribute of the packet and facilitate a subsequent forwarding operation performed on the packet. In a more specific implementation, for a format of the VXLAN packet, refer to the standard Request for Comments (RFC) 7348. All content of the standard is introduced into the embodiments of this application herein. Alternatively, in another possible implementation, after decapsulating the packet and determining that the packet is from the tunnel, the network device may generate an identifier field corresponding to the tunnel attribute of the packet. The identifier field is used to identify that the packet received by the network device has the tunnel attribute.

It may be understood that the foregoing describes the tunnel attribute information by using an example in which a tunnel is the VXLAN tunnel. In this embodiment of this application, the tunnel attribute information carried in the first packet may be tunnel attribute information, for example, MPLS tunnel attribute information or SR tunnel attribute information. This is not limited in this embodiment of this application.

Although the foregoing method embodiment is described by using the network structure of the data center shown in FIG. 1 as an example, it may be further understood that the network structure of the data center is not a unique limitation of this method embodiment. In an actual application, this method embodiment may be used to resolve a similar problem in another application scenario or another network structure.

In this embodiment, after the network device decapsulates the first packet and determines that the first packet carries the tunnel attribute information, the network device may update the decapsulated first packet based on the tunnel attribute information carried in the first packet, so that an updated first packet includes the first tunnel identifier.

The network device may update the decapsulated first packet in a plurality of manners.

In a possible implementation, after decapsulating the first packet, the network device may retain some data bits in the first packet before decapsulation, and use the data bits as the first tunnel identifier of the first packet, to update the first packet. In other words, compared with an original first packet, the updated first packet further includes some reserved data bits, and some data bits are used to indicate the first tunnel identifier of the first packet. The some of the data bits reserved by the network device in the first packet may be data bits that are in the first packet before decapsulation and that are used to indicate the tunnel attribute information of the first packet, for example, may be a VXLAN header in the first packet or some data bits in the VXLAN header. In a possible specific example, the network device may reserve a VXLAN flag (VXLAN flags) in the VXLAN header in the first packet or some data bits in the VXLAN flag in the first packet. The VXLAN flag in the VXLAN header is 16 bits. In other words, the network device may reserve a 16-bit VXLAN flag in the first packet or reserve some data bits of the 16-bit VXLAN flag in the first packet.

It may be understood that, when the network device indicates a tunnel identifier of a packet by using the some of the reserved data bits, in the foregoing embodiment corresponding to FIG. 5, that the first tunnel identifier and the second tunnel identifier are first values includes that the first tunnel identifier is some data bits that are in the first packet before decapsulation and that may be used to indicate the tunnel attribute information. The second tunnel identifier is some data bits that are in the second packet before decapsulation and that may be used to indicate the tunnel attribute information. The second tunnel identifier may be the same as the first tunnel identifier. In the foregoing embodiment corresponding to FIG. 6, that the third tunnel identifier is the second value may include that the third tunnel identifier is a null value, in other words, the third tunnel identifier is a null value, or the third tunnel identifier is another non-null value different from the first value. In other words, when the third packet is from the user side, the network device may determine that a tunnel identifier of the third packet is the second value different from the first value, and forward the third packet based on the first routing group and the second routing group that are in the VRF table when subsequently performing an operation of forwarding the third packet.

In another possible implementation, after decapsulating the first packet, the network device may add a specific field to the decapsulated first packet as the first tunnel identifier of the first packet, to update the first packet. In other words, compared with the original first packet, the updated first packet further includes the added specific field, and the specific field is used to indicate the first tunnel identifier of the first packet.

In a possible example, the network device may indicate the tunnel identifier of the packet by using a two-bit field. For example, when tunnel attribute information of the packet is VXLAN tunnel attribute information, in other words, when the packet is from the VXLAN tunnel, the network device may indicate the tunnel identifier of the packet by using a field "01". When the tunnel attribute information of the packet is MPLS tunnel attribute information, in other words, when the packet is from an MPLS tunnel, the network device may indicate the tunnel identifier of the packet by using a field "10". When the tunnel attribute information of the packet is the SR tunnel attribute information, in other words, when the packet is from an SR tunnel, the network device may indicate the tunnel identifier of the packet by using a field "11". In addition, when the packet does not carry the tunnel attribute information, for example, when the packet is from a local VM, the network device may indicate the tunnel identifier of the packet by using a field "00".

It may be understood that, when the network device indicates the tunnel identifier of the packet by using the specific field, in the foregoing embodiment corresponding to FIG. 5, that the first tunnel identifier and the second tunnel identifier are first values includes that the first tunnel identifier is any one of the fields "01", "10", and "11", and is used to indicate that the first packet is traffic from a transmission tunnel. The second tunnel identifier may also be any one of the fields "01", "10", and "11", and is used to indicate that the second packet is traffic from the transmission tunnel. In the foregoing embodiment corresponding to FIG. 6, that the third tunnel identifier is the second value may be the third tunnel identifier is the field "00", and is used to indicate that the third packet is traffic from the user side.

In another possible implementation, the third packet does not include the third tunnel identifier used to indicate that the packet is a user-side packet. When the third packet does not include the tunnel identifier, the network device may forward the third packet based on the first routing group and the second routing group in the VRF.

For ease of understanding, the following describes in detail the packet forwarding method provided in the embodiments of this application with reference to specific examples.

The service scenario shown in FIG. 3 is used as an example. When a prefix (namely, a destination address) is 1.1.1.1, the VRF table on the leaf switch 1 includes two local routes (next hops are the VM 1 and the VM 2) and two remote routes (next hops are the VM 3 and the VM 4). In other words, the two local routes whose next hops are the VM 1 and the VM 2 belong to the first routing group, and the two remote routes whose next hops are the VM 3 and the VM 4 belong to the second routing group.

After the leaf switch 1 receives a packet 1 forwarded by a DCGW by using the spine switch 1, the leaf switch 1 may determine, after decapsulating the packet 1, that the packet 1 carries VXLAN tunnel attribute information. Therefore, the leaf switch 1 may update the decapsulated packet 1, so that an updated packet 1 includes a tunnel identifier whose value is the first value. In a process of forwarding the packet 1, when the tunnel identifier in the packet 1 is the first value, the network device forwards the packet 1 based on the first routing group in the VRF table. For example, when a destination address of the packet 1 is 1.1.1.1, the leaf switch 1 may determine, in the first VRF table, a route whose next hop is the VM 1 and a route whose next hop is the VM 2 as a route that may be used to forward the packet. Then, the leaf switch 1 determines, in the foregoing two routes, one route that is used to forward the packet 1. In this way, the packet is forwarded to the local VM 1 or the local VM 2.

For a packet forwarded to the leaf switch 1 by a tunnel endpoint device, for example, the DCGW or the leaf switch 2, the leaf switch 1 implements packet forwarding based on the first routing group in the VRF table, so that the leaf switch 1 can be prevented from selecting a remote route and forwarding the packet to the leaf switch 2 again. This prevents a routing loop.

In addition, for the service scenario shown in FIG. 4, when the leaf switch 1 receives a packet 2 sent by the local VM, after the leaf switch 1 determines that the packet 2 does not carry tunnel attribute information, the leaf switch 1 may update the packet 2, so that an updated packet 2 includes a tunnel identifier whose value is the second value. In a process of forwarding the packet 2, when the tunnel identifier in the packet 2 is the second value, the network device forwards the packet 2 based on the first routing group and the second routing group in the VRF table. In other words, the network device does not need to preferably select a local route. Therefore, it can be ensured that the leaf switch 1 selects, according to a load balancing policy, one of the local route and the remote route as a route used to forward the packet. To be specific, it can be ensured that load balancing can be implemented when the leaf switch 1 forwards a packet (namely, a local packet) sent by the local VM, and a resource waste is avoided.

Figure 8:
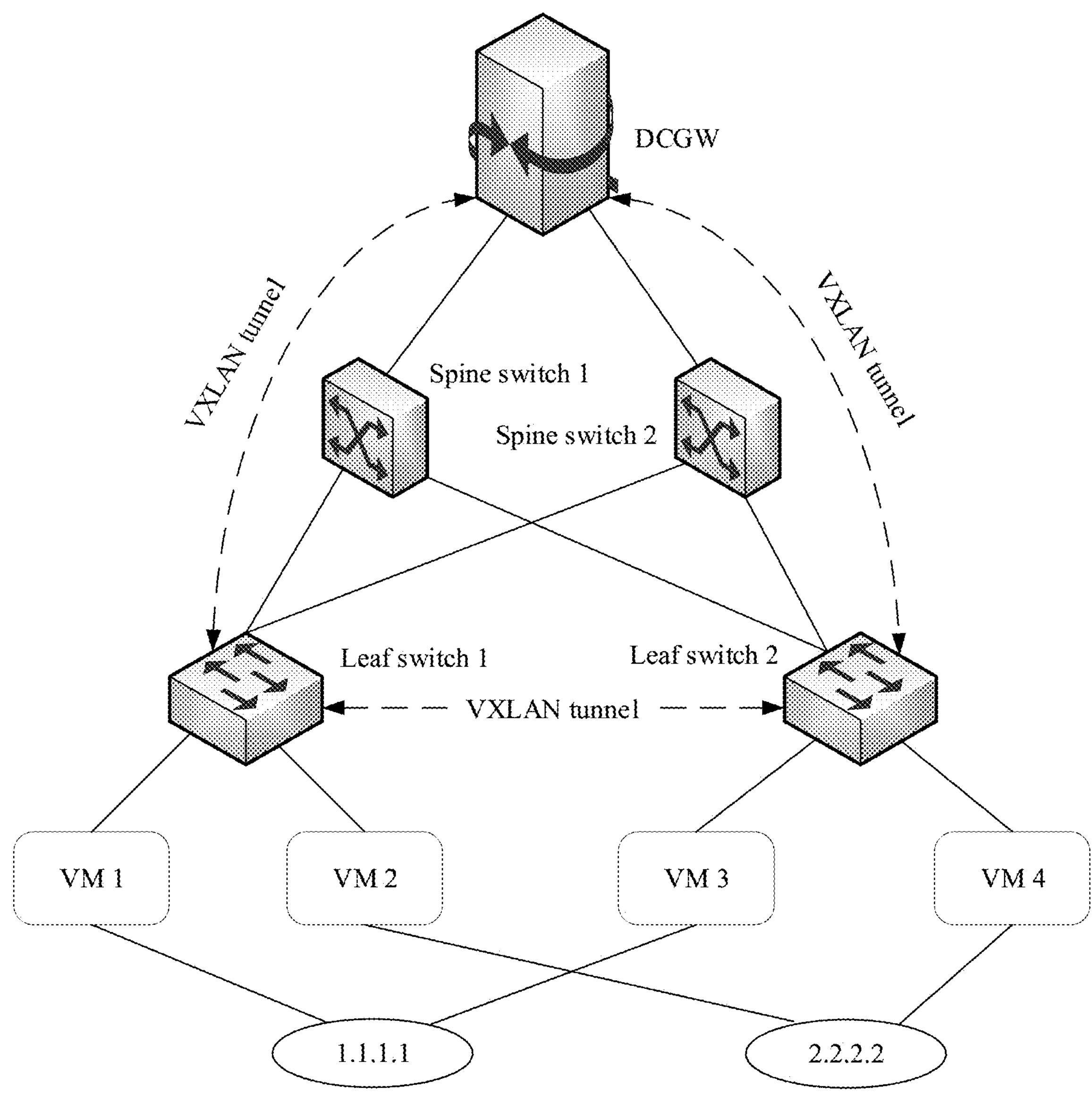
FIG. 8 is a schematic diagram of another service scenario according to an embodiment of this application.

FIG. 8 is a schematic diagram of another service scenario according to an embodiment of this application.

In the service scenario corresponding to FIG. 8, a VNF network element 1 is distributed on a VM 1 and a VM 3, and the VM 1 and the VM 3 share a same IP address 1.1.1.1. A VNF network element 2 is distributed on a VM 2 and a VM 4, and the VM 2 and the VM 4 share a same IP address 2.2.2.2. In addition, the VM 1 and the VM 2 are connected to a leaf switch 1, and the VM 3 and the VM 4 are connected to a leaf switch 2.

For the leaf switch 1, a VRF table included in the leaf switch 1 may be:

prefix: 1.1.1.1 next hop: VM 1 flag: 1 (local)
(—prefix: 1.1.1.1 next hop: VM 1 flag: 1 (local))
prefix: 2.2.2.2 next hop: VM 2 flag: 1 (local)
(—prefix: 2.2.2.2 next hop: VM 2 flag: 1 (local))
prefix: 1.1.1.1 next hop: VM 3 flag: 0 (remote)
(—prefix: 1.1.1.1 next hop: VM 3 flag: 0 (remote))
prefix: 2.2.2.2 next hop: VM 4 flag: 0 (remote)
(—prefix: 2.2.2.2 next hop: VM 4 flag: 0 (remote))

Routes whose next hops are the VM 1 and the VM 2 belong to a first routing group, and routes whose next hops are the VM 3 and the VM 4 belong to a second routing group.

When the leaf switch 1 receives a packet forwarded by a DCGW or the leaf switch 2, the packet carries tunnel attribute information and a value of a tunnel identifier corresponding to the packet is a first value. Therefore, a leaf switch forwards a packet based on the first routing group. To be specific, it is ensured that a packet whose destination address is 1.1.1.1 is forwarded to the VM 1 and a packet whose destination address is 2.2.2.2 is forwarded to the VM 2, and a case that the leaf switch 1 forwards the packet to the leaf switch 2 again does not occur.

In addition, when the leaf switch receives a packet that is from the VM 1 and whose destination address is 2.2.2.2, because the packet does not carry tunnel attribute information and a value of a tunnel identifier corresponding to the packet is a second value, the leaf switch 1 forwards the packet based on the first routing group and the second routing group in the VRF table. In other words, the leaf switch 1 may select, according to a load balancing policy, one route from two routes whose next hops are the VM 2 and the VM 4 as a route used to forward the packet, to implement load balancing and avoid a resource waste.

In other words, after the network device uses the packet forwarding method provided in the embodiments of this application, a routing loop can be avoided. In addition, it can be ensured that packet forwarding can be implemented according to the load balancing policy, and the resource waste is avoided.

Figure 9:
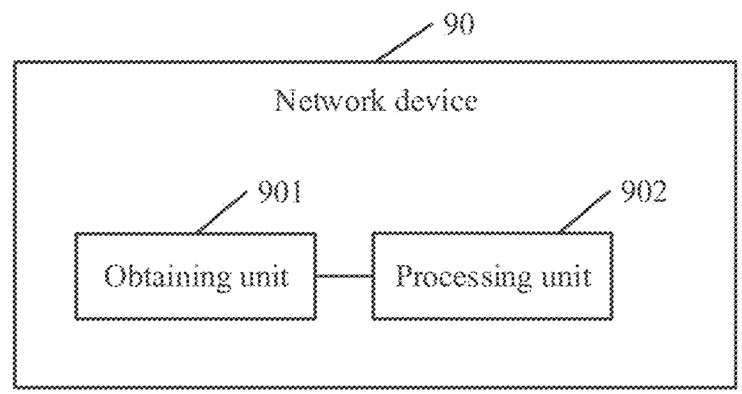
FIG. 9 is a schematic structural diagram of a network device according to an embodiment of this application.

FIG. 9 is a schematic structural diagram of a network device according to an embodiment of this application. A network device 90 provided in this embodiment of this application may be, for example, the leaf switch 1 or the leaf switch 2 in the foregoing method embodiments. The network device 90 may include, for example, an obtaining unit 901, configured to obtain a first tunnel identifier of a first packet, and a processing unit 902, configured to when the first tunnel identifier is a first value, forward the first packet based on a first routing group in a VRF table. The first routing group consists of one or more local routes, and each next-hop outbound interface of the one or more local routes is a local outbound interface. The VRF table further includes a second routing group, and the second routing group includes one or more remote routes whose next-hop outbound interfaces are remote outbound interfaces.

Optionally, in a possible implementation, the processing unit 902 is further configured to search the VRF table for first route mark information based on the first tunnel identifier in the first packet as the first value, to determine the first routing group corresponding to the first route mark information, and forward the first packet based on the determined first routing group.

Optionally, in a possible implementation, the network device has a load balancing capability. The obtaining unit 901 is further configured to obtain a second tunnel identifier of a second packet, and the first packet and the second packet belong to same service traffic. The processing unit 902 is further configured to determine a first route in the first routing group, and forward the first packet based on the first route, and determine a second route in the first routing group based on the second tunnel identifier as the first value, and forward the second packet based on the second route.

Optionally, in a possible implementation, the obtaining unit 901 is further configured to obtain a third tunnel identifier of a third packet. The processing unit 902 is further configured to search, using the third tunnel identifier as a second value, for a route based on the first routing group and the second routing group that are in the VRF table to forward the third packet.

Optionally, in a possible implementation, the second routing group in the VRF table does not have mark information or corresponds to second route mark information.

Optionally, in a possible implementation, the obtaining unit 901 is further configured to receive the first packet. The processing unit 902 is further configured to update the first packet based on tunnel attribute information carried in the received first packet, and an updated first packet includes the first tunnel identifier corresponding to the tunnel attribute information.

Optionally, in a possible implementation, the tunnel attribute information is VXLAN tunnel attribute information, MPLS tunnel attribute information, or SR tunnel attribute information.

Optionally, in a possible implementation, the network device is a device connected to a plurality of virtual machines in a data center network.

Figure 10:
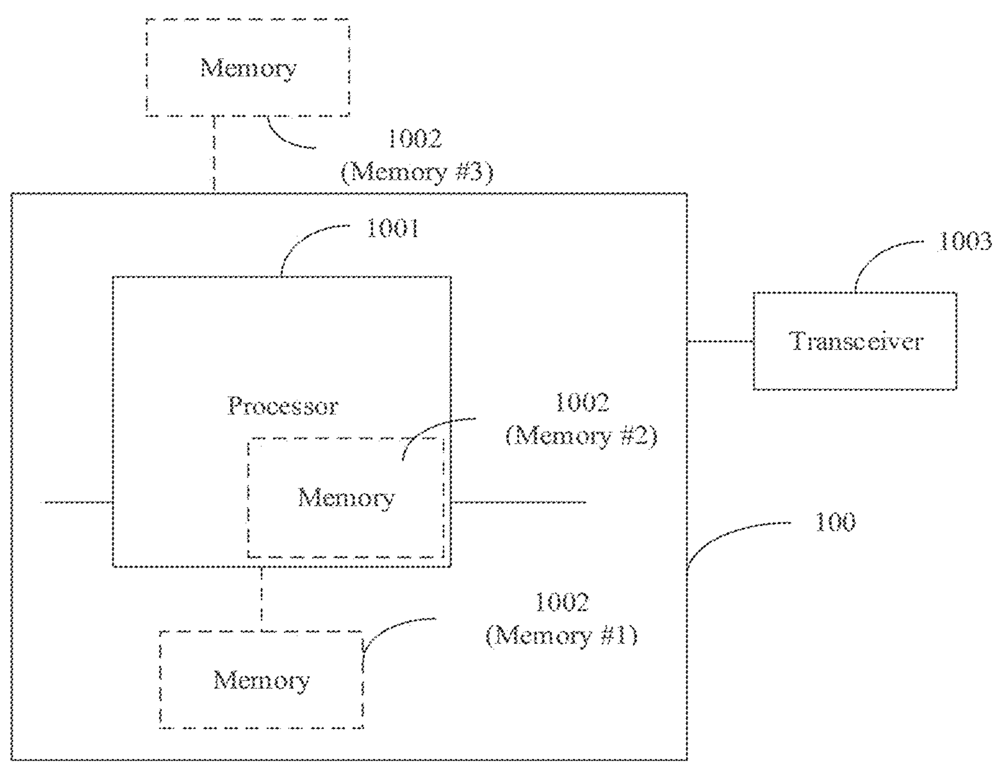
FIG. 10 is a schematic structural diagram of a network device according to an embodiment of this application.

FIG. 10 is a schematic structural diagram of a network device according to an embodiment of this application. As shown in FIG. 10, a network device 100 is provided. The network device 100 may be, for example, the second network device in the foregoing method embodiments. The network device 100 includes a processor 1001. The processor 1001 is coupled to a memory 1002. The memory 1002 may be independent of the processor 1001 or independent of the network device 100, for example, a memory #3. The memory 1002 may alternatively be inside the processor 1001 or the network device 100 (a memory #1 and a memory #2). The memory 1002 may be a physically independent unit, or may be storage space, a network hard disk, or the like on a cloud server. Optionally, there may be one or more memories 1002. When there is a plurality of memories 1002, the plurality of memories 1002 may be located at a same location or different locations, and may be used independently or in cooperation.

The memory 1002 is configured to store a computer-readable instruction (or a computer program).

The processor 1001 is configured to read the computer-readable instruction to implement the method provided in any one of the foregoing aspects related to the network device and the implementations thereof.

Optionally, the network device 100 further includes a transceiver 1003, configured to receive and send data.

In addition, the processor 1001 may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. In addition, the memory 1002 may include a volatile memory, for example, a random-access memory (RAM). The memory may alternatively include a non-volatile memory, for example, a flash memory, a hard disk drive (HDD), a solid-state drive (SSD), cloud storage, network attached storage, or a network drive. The memory may further include a combination of the foregoing types of memories or another medium or product in any form that has a storage function.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is one example. For example, division into the units is logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a Universal Serial Bus (USB) flash drive, a removable hard disk, a read-only memory (ROM), a RAM, a magnetic disk, or an optical disc.

The invention claimed is:

1. A method implemented by a network device, wherein the method comprises:

receiving a first packet;

obtaining a first tunnel identifier of the first packet, wherein the first tunnel identifier is a first value; and forwarding the first packet based on a first routing group in a virtual routing and forwarding (VRF) table when the first tunnel identifier is the first value, wherein the first routing group comprises one or more local routes, wherein a next-hop outbound interface of each of the one or more local routes is a local outbound interface, wherein the VRF table further comprises a second routing group, and wherein the second routing group comprises a remote route comprising a remote outbound interface as a next-hop outbound interface.

2. The method of claim 1, further comprising searching the VRF table for first route mark information based on the first value to determine the first routing group, wherein the first routing group corresponds to the first route mark information.

3. The method of claim 1, further comprising:

receiving a second packet;

obtaining a second tunnel identifier of the second packet, wherein the first packet and the second packet belong to same service traffic;

determining a first route in the first routing group;

further forwarding the first packet based on the first route;

determining a second route in the first routing group based on the second tunnel identifier as the first value; and forwarding the second packet based on the second route.

4. The method of claim 1, further comprising:

receiving a third packet;

obtaining a third tunnel identifier of the third packet; and searching, based on the first routing group and the second routing group and using the third tunnel identifier as a second value, for a route to forward the third packet.

5. The method of claim 4, wherein the second routing group does not comprise mark information.

6. The method of claim 1, wherein before obtaining the first tunnel identifier, the method further comprises updating the first packet based on tunnel attribute information carried in the first packet, wherein the first tunnel identifier corresponds to the tunnel attribute information.

7. The method of claim 6, wherein the tunnel attribute information is Virtual Extensible Local Area Network (VXLAN) tunnel attribute information, Multiprotocol Label Switching (MPLS) tunnel attribute information, or segment routing (SR) tunnel attribute information.

8. The method of claim 1, wherein the network device is coupled to a plurality of virtual machines in a data center network.

9. A network device comprising:

a memory configured to store instructions; and a processor coupled to the memory, wherein the instructions, when executed by the processor, cause the network device to be configured to:

receive a first packet;

obtain a first tunnel identifier of the first packet, wherein the first tunnel identifier is a first value; and forward the first packet based on a first routing group in a virtual routing and forwarding (VRF) table when the first tunnel identifier is the first value, wherein the first routing group comprises one or more local routes, wherein a next-hop outbound interface of each of the one or more local routes is a local outbound interface, wherein the VRF table further comprises a second routing group, and wherein the second routing group comprises a remote route comprising a remote outbound interface as a next-hop outbound interface.

10. The network device of claim 9, wherein the instructions, when executed by the processor, further cause the network device to be configured to search the VRF table for first route mark information based on the first tunnel identifier as the first value to determine the first routing group, and wherein the first routing group corresponds to the first route mark information.

11. The network device of claim 9, wherein the network device comprises a load balancing capability, and wherein the instructions, when executed by the processor, further cause the network device to be configured to:

receive a second packet;

obtain a second tunnel identifier of the second packet, wherein the first packet and the second packet belong to same service traffic;

determine a first route in the first routing group;

further forward the first packet based on the first route;

determine a second route in the first routing group based on the second tunnel identifier as the first value; and forward the second packet based on the second route.

12. The network device of claim 9, wherein the instructions, when executed by the processor, further cause the network device to be configured to:

receive a third packet;

obtain a third tunnel identifier of the third packet; and search, based on the first routing group and the second routing group and using the third tunnel identifier as a second value, for a route to forward the third packet.

13. The network device of claim 12, wherein the second routing group does not comprise mark information.

14. The network device of claim 9, wherein the instructions, when executed by the processor, further cause the network device to be configured to update the first packet based on tunnel attribute information carried in the first packet, wherein the first tunnel identifier corresponds to the tunnel attribute information.

15. The network device of claim 14, wherein the tunnel attribute information is Virtual Extensible Local Area Network (VXLAN) tunnel attribute information, Multiprotocol Label Switching (MPLS) tunnel attribute information, or segment routing (SR) tunnel attribute information.

16. The network device of claim 9, wherein the network device is coupled to a plurality of virtual machines in a data center network.

17. A computer program product comprising computer-executable instructions stored on a non-transitory computer-readable storage medium that, when executed by a processor, cause an apparatus to:

receive a first packet;

obtain a first tunnel identifier of the first packet, wherein the first tunnel identifier is a first value; and forward the first packet based on a first routing group in a virtual routing and forwarding (VRF) table when the first tunnel identifier is the first value, wherein the first routing group comprises one or more local routes, wherein a next-hop outbound interface of each of the one or more local routes is a local outbound interface, wherein the VRF table further comprises a second routing group, and wherein the second routing group comprises a remote route comprising a remote outbound interface as a next-hop outbound interface.

18. The computer program product of claim 17, wherein the computer-executable instructions further cause the apparatus to search the VRF table for first route mark information based on the first tunnel identifier as the first value to determine the first routing group, and wherein the first routing group corresponds to the first route mark information.

19. The computer program product of claim 17, wherein the computer-executable instructions further cause the apparatus to:

receive a second packet;

obtain a second tunnel identifier of the second packet, wherein the first packet and the second packet belong to same service traffic;

determine a first route in the first routing group;

further forward the first packet based on the first route;

determine a second route in the first routing group based on the second tunnel identifier as the first value; and forward the second packet based on the second route.

20. The computer program product of claim 17, wherein the computer-executable instructions further cause the apparatus to:

receive a third packet;

obtain a third tunnel identifier of the third packet; and search, based on the first routing group and the second routing group and using the third tunnel identifier as a second value, for a route to forward the third packet.

* * * * *